Jan. 15, 1957  H. W. SAMO ET AL  2,777,250
DOLLS' EYES
Filed Nov. 6, 1953  2 Sheets-Sheet 1
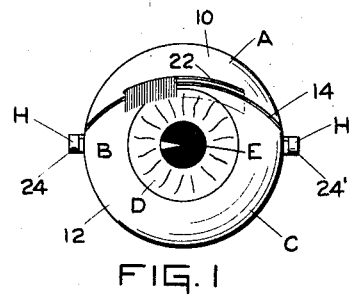
FIG. 1
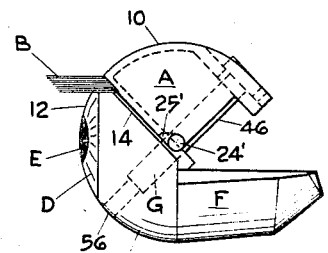
FIG. 2
FIG. 3
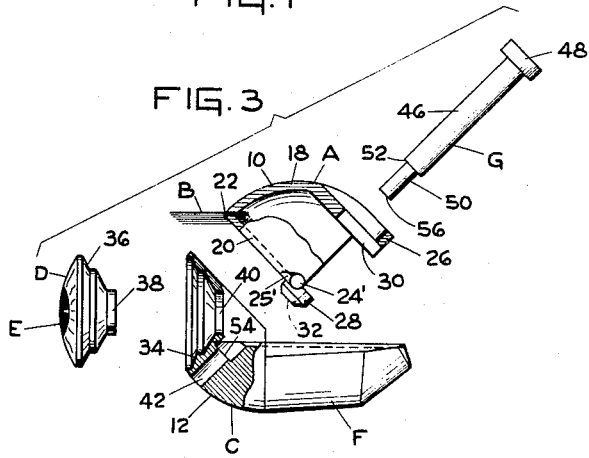
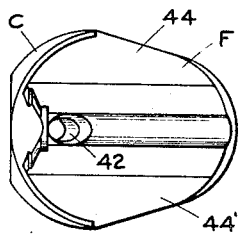
FIG. 4
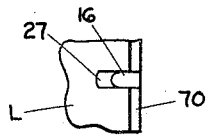
FIG. 7
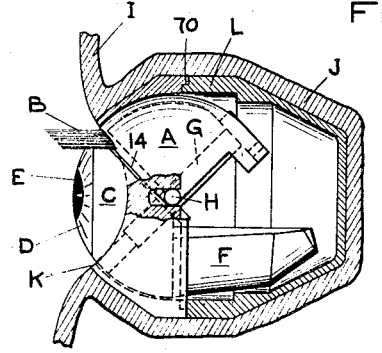
FIG. 6
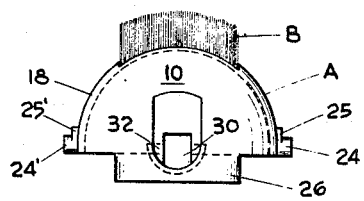
FIG. 5
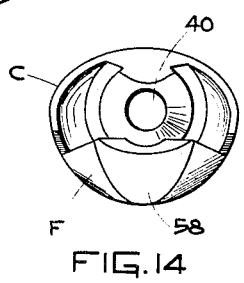
FIG. 14
INVENTORS
HARVEY W. SAMO AND
BY  ALBERT BASHOVER
*James and Franklin*
ATTORNEYS Jan. 15, 1957  H. W. SAMO ET AL  2,777,250
DOLLS' EYES Filed Nov. 6, 1953  2 Sheets-Sheet 2

INVENTORS
HARVEY W. SAMO AND
BY ALBERT BASHOVER

*James and Franklin*
ATTORNEYS

United States Patent Office 2,777,250
Patented Jan. 15, 1957

2,777,250
DOLLS' EYES

Harvey W. Samo, Bayonne, and Albert Bashover, Newark, N. J., assignors to Margon Corporation, Bayonne, N. J., a corporation of New Jersey Application November 6, 1953, Serial No. 390,562

12 Claims. (Cl. 46—166)

The invention relates to eyes for dolls, and more particularly to eyes constructed to afford both sleeping and rolling movements.

According to the present invention, the eye assembly is made to most closely simulate the movements of the human eye. The eye assembly comprises an eyelid member, preferably having an eyelash secured thereto, and an eyeball member having an iris and pupil represented thereon. For the sleeping action, the eyelid, lash and eyeball appear to close when the doll is moved from an upright to a horizontal or supine position, whereas, for the rolling or flirting action, as when the doll is tilted sidewardly from the vertical, the eyeball appears to move sidewardly toward a corner of an eye opening of the doll's head.

The foregoing movements of dolls' eyes have been variously simulated by workers in the art. Generally, an additional member, such as a separate outer shell, ring, or support providing a universal bearing, has been used to furnish the means for oscillatably supporting a hemispherical eyeshell about a vertical axis to obtain the rolling action. The use of the surrounding shell or ring adds another layer of material and clearance space to the assembly in the direction of viewing the eye, so that the eyeball is moved further back in the head. This results in the eyeball appearing to be set in the head to an unnatural depth. With the added support for a universal bearing there is an undue increase in bulk of the assembly.

With eyes of the individual or unitary type, wherein the eye assembly is a self-contained unit, difficulty has been encountered in the simulation of the human eye, because securing an eyelash to the eyeshell has resulted in interference between the lash and the eye opening of the doll's head to prevent the sideward motion of the eyeshell.

The primary object of the present invention is to improve dolls' eyes of the sleeping-rolling type.

A more specific object of the invention is to provide a sleeping-rolling eye assembly which is so constructed that the eyeball is positioned in the head no deeper than an ordinary sleeping eye.

Another object of the invention is to provide a sleeping-rolling eye assembly of the individual or unitary type having an eyelash which moves up and down with the eyelid for the sleeping and awakening effect, but which does not move sidewardly when the eyeball moves toward the corner of an eye opening during the rolling or flirting action.

A further object of the invention is to provide a sleeping-rolling eye assembly which will operate within the space limitations of a previously standardized sleeping eye, thus necessitating no change in the molds used by the doll manufacturer in molding doll heads, and no change in the housing supplied by the eye manufacturer for the eye assembly.

Still another object of the invention is to provide a sleeping-rolling eye assembly of simple construction, and made with a minimum number of parts which may be fabricated and assembled very easily, thereby permitting a highly satisfactory product to be manufactured at a relatively low cost.

To the accomplishment of the foregoing and such other objects as will hereinafter appear, our invention relates to an eye assembly and the elements thereof related to each other as are hereinafter more particularly described in the following specification. The specification is accompanied by drawings, in which:

Fig. 1 is a front view of a preferred form of a single eye assembly for a doll, the eyelash element thereof being shown in part;

Fig. 2 is a side view of the assembly shown in Fig. 1;

Fig. 3 is an exploded side view of the eye assembly showing the relationship of the component parts, and the manner in which they are assembled;

Fig. 4 is a plan view of the eyeball member of the assembly, said member also including a weight element;

Fig. 5 is a plan view of the eyelid member of the eye assembly;

Fig. 6 is a side elevation, partly in section, showing the eye assembly of the present invention mounted in a housing, which in turn is disposed in an eye socket of a flexible doll's head;

Fig. 7 is a fragmentary side elevation showing a bearing portion of the housing for the pivotal mounting of the eye assembly;

Fig. 14 is a rear view of the die-cast weight and eye member.

Figure 8:
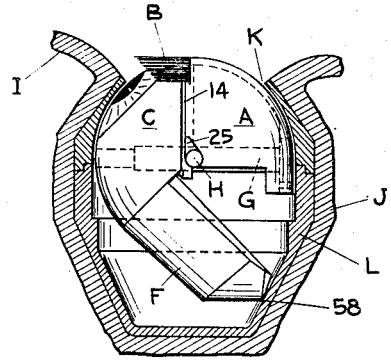
Fig. 8 is a view similar to Fig. 6, but showing the relationship of the eye assembly with respect to the housing and eye opening of the doll's head when the doll has been moved from the upright position of Fig. 6 to a recumbent or sleeping position.

Generally, and as shown in Figs. 1 to 5, the eye assembly comprises a flesh-colored eyelid member A, which preferably supports a lash B, and a separate eyeball member C. The eyeball member C has a suitable representation of an iris D and a pupil E on the front thereof, and is provided with a weight member F extending at the rear. The eyelid and eyeball members are made with their front or viewable surfaces 10 and 12, respectively, having the same radius of curvature so that when they are assembled, as shown in Figs. 1 and 2, these surfaces form a substantially continuous spherical surface, except where the elements abut each other at the split line 14.

The eyelid and eyeball members are directly connected to each other by suitable means, designated G, which provides a rearwardly inclined axis about which the eyeball member may move laterally or from side to side with respect to the eyelid member. In effect, the eyeball member is oscillatably suspended from the eyelid member. The eyelid member is provided with horizontally arranged pivot means H about which both the eyelid and eyeball members may oscillate together in a vertical plane. Thus, the eyelid and eyeball members are connected to each other so that the force of gravity upon the weight F will cause both elements to oscillate together about the horizontally arranged pivot means to thereby supply the sleeping motion when the doll is moved from an upright to a horizontal position, or from the position shown in Fig. 6 to the position shown in Fig. 8. The same weight member will cause the eyeball member to swing about the rearwardly inclined axis of the connecting means G for the rolling motion, when the doll's head is tilted from an upright position to a sidewardly inclined position as shown in Fig. 9.

Reverting to Figs. 2 and 6 of the drawing, it may be stated that in its simplest and preferred form the eyeball member C and the eyelid member A are divided from one another on an approximately diametric plane, this being the plane of the line 14. The pivot means G lies on a diameter of the sphere and is perpendicular to the dividing plane. The axis of horizontal pivot means H is also a diameter of the sphere, which diameter lies approximately in the dividing plane, and intersects and is perpendicular to the axis of pivot G. The pivot means H forms a part of and serves to support the eyelid member A, and the dividing plane 14 may be offset downwardly slightly from true diametric position, as will be seen in Figure 2. The eyeball member is suspended or supported from the eyelid member solely by the pivot means G. It will be evident from inspection of Fig. 6 that the eyelid member A is at least about a quarter segment of a sphere in order to provide sufficient eyelid surface for the sleeping position of the eye. Similarly the eyeball portion C is at least about a quarter segment of a sphere, in order to fill the eye opening when the eye is in its open or forward looking position. In the form shown these two segments are disposed with approximately diametric plane faces in contact to form at least a hemisphere. However, it is not essential that they abut in a plane surface, it being sufficient that they abut on surfaces of revolution such as will not interfere with the rolling movement of the eyeball member relative to the eyelid member.

The preferred and illustrated form of the invention relates to an eye assembly of the individual or unitary type, which is particularly adapted for use in dolls' heads of flexible material. Such dolls' heads are usually stuffed so that the amount of space available for the eye assembly is very limited. This type of head is designated I in Figs. 6, 8 and 9, and is provided with enclosed eye sockets J open only to the front at the eye openings K. For heads of this type of material and general construction, the eye assembly is preliminarily mounted within a suitable housing L. The specific eye housing shown is a two-piece housing, and is generally of the type described in detail in the application of Howard Wolfe, et al., Serial No. 224,351, filed May 3, 1951, now Patent No. 2,696,064, having the same assignee as the assignee of the present application. The housing is provided with diametrically opposite bearings 16 (Fig. 7), which heretofore matingly received the horizontally arranged pivot means or trunnions of a sleeping eye, but which here receive the trunnions of the new eye assembly.

In fact, one advantage of the eye assembly of the present invention is that it is capable of operating within the limitations of the small available space for such a unit, notwithstanding that it possesses the additional function of a lateral or side-to-side movement of the eyeball. This is of advantage to the eye manufacturer in making it possible for him to use the same housing L as is used for sleeping eyes. It is of even greater importance in that the numerous doll manufacturers may use their molds for the doll heads without necessitating a change in the shape or dimension of the sockets J at the eye openings. Moreover, the manufacturer has greater flexibility in output, for he may use the same heads to receive either the sleeping eye, or the present sleeping-rolling eye, according to orders received from his customers.

To describe the components of the eye assembly in greater detail, and as shown in Figs. 2, 3 and 5, the eyelid member A is preferably molded from flesh-colored plastic material as approximately a quarter of a hollow sphere which is open at the rear. The member includes a wall 18, which provides the exposed spherical surface 19, and a bottom wall 20 having substantially the form of a semi-circular disc. The hollow formation opening at the rear of the element provides access to the inside and so permits cementing of the rear edge of the lash B to the bottom wall 20, the lash extending through a slot 22 formed in the wall 18 near its juncture with the wall 20 at the front of the piece. The location of the lash near the split line 14 which follows an arc between the eyelid and eyeball serves to heighten the effect of the lash by its apparent extension along the split line. For the horizontally arranged pivot means H, outwardly extending trunnions 24, 24' may be molded integrally with the member. The trunnions are located on diametrically opposite sides of the member where the walls 18 and 20 intersect at their rear edges. Adjacent the trunnions, motion limiting stops or ears 25, 25' are provided, which stops are adapted to be received in slots 27 (Fig. 7) adjacent the bearings 16 in the housing, for a purpose to be subsequently described. The slots 27 are not as deep as the bearings 16, so that the trunnions are held in the bearing 16, and cannot move into the slot 27. The part 70 is the outwardly stepped flange of the forward part of the housing. The walls 18 and 20 are provided with centrally located extensions or bearing ears 26 and 28, respectively, so that aligned bearing apertures 30 and 32 may be formed therein with their centers bisecting the horizontal axis afforded by the horizontally arranged pivot means or trunnions 24, 24'.

The eyeball member C, as shown in Figs. 2, 3 and 4, is preferably formed by die-casting a suitable metal of heavy mass, and, in this way, the weight member F, which extends at the rear thereof, may be formed as an integral portion of the eyeball member. The eyeball portion itself is made with a front surface of revolution approximately equal to three-eighths of a sphere, the bottom rear eighth providing a smooth transition to the weight member. The front of the eyeball member is cast with a seat 34 shaped to receive a lens 36 which simulates the iris D and the pupil E. The lens is provided with a rearwardly extending stud 38 which passes through a central aperture 40 cast in the member. The lens construction is substantially as shown in Marcus Patent 2,254,232, granted September 2, 1941. When the lens is assembled with the eyeball member, the front surface of the eyeball member provides a substantially continuous spherical surface having the same radius curvature as the eyelid member A.

To simulate the white of the eye, the eyeball member is sprayed or painted on the front with a white paint in the area surrounding the iris portion of the lens. The painting or spraying is preferably done before inserting the lens so that it is unnecessary to mask the lens. A hole 42 extending at an angle of approximately 45° is formed through the eyeball member, as by drilling, this hole being located below the seat for the lens. Also, the integrally formed weight portion F may be so shaped that its side portions act also as stops 44, 44' for engagement with the eyelid member, as will be subsequently described.

The means G for connecting the eyelid and eyeball members together preferably comprises a pin 46 having an enlarged or headed portion 48 at the top and a shank 50 of reduced diameter at its lower end. The pin 46 is passed through the apertures 30 and 32 of the eyelid member, and through the aperture 42 in the eyeball member, until its shoulder 52 engages the shoulder 54 formed in the eyeball aperture. In this way, the small amount of clearance desired between the elements at the split line 14 may be assured even if the extreme lower end 56 is peened over to complete the assembly. This is so because the distance between the head of the pin and the shoulder 52 is not affected by a peening, riveting, or like operation. When the elements are assembled, the connecting means or pin G, bisects the horizontally arranged pivot means H, and is at a right angle to the plane of the split line 14. As shown in Figs. 2 and 6, the eyelid and eyeball members are so related to each other that the pin is inclined rearwardly at an angle of approximately 45° when the iris and pupil look directly forward in the open position of the eye. Differently expressed, the eyelid appears to be raised to an angle of about 45° when the eye is open, and the pin G is perpendicular to the plane of the lower edge of the eyelid.

With the elements thus assembled, the outwardly extending trunnions 24, 24' are placed within the mating bearings 16 of the two piece housing L, and the ears 25, 25' are located within the adjacent slots 27. The bearings are open when the two parts of the housing are apart. The eye assembly is placed in either part of the housing, and the bearings are closed around the trunnions by adding the other part. The complete assembly is then inserted in the eye socket J of a doll head, as shown in Fig. 6. The parts are arranged so that with the doll's head in upright position, the iris and pupil look directly forward through the eye opening K.

Figure 9:
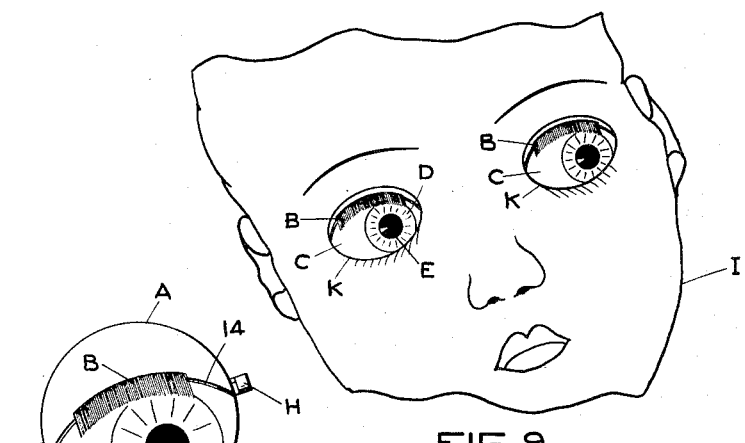
Fig. 9 is a front view of a doll's head showing the position of the eyes when the head has been tilted, thereby causing the eyes to appear to move sidewardly to the opposite corners of the eye openings.

When the doll is moved from the vertical or upright position of Fig. 6, to a horizontal or recumbent position, as shown in Fig. 8, the force of gravity upon the weight element F will cause the doll and the housing to move, relatively to both the eyelid and eyeball members, which pivot together about the horizontal axis provided by the trunnions 24, 24' within their mating bearings 16. The limit of "sleep" movement is provided for by suitably dimensioning the weight portion F so that its rear end, designated 58, will engage the inside surface of the housing L, as shown in Fig. 8.

Figure 10:
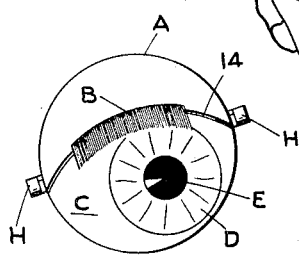
Figs. 10, 11 and 12 are front, top and rear views, respectively, of an eye assembly showing the relationship of the parts thereof when a doll's head is in the position shown in Fig. 9, the view of Fig. 11 showing the eyelash in part.
Figure 11:
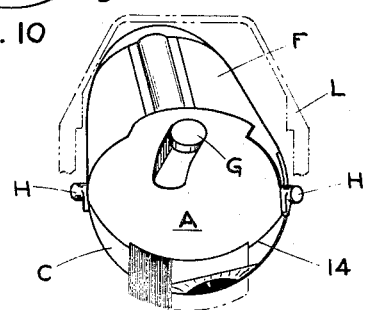
Figure 12:
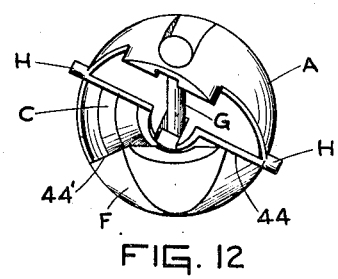

For the side-to-side or rolling motion, as when the doll's head is tilted sidewardly to the left from the upright position as shown in Fig. 9, the iris and pupil of each eye assembly move sidewardly to the right corner of each eye opening. As shown in Figs. 10 to 12, as the doll's head is tilted, the eye remains open because the axis about which the eyelid and eyeball members may pivot for movement in sleeping direction (the "sleeping axis" or horizontally arranged pivot H), is maintained generally parallel to the direction of tilting. The eyelid member is thus tilted as the head is tilted, and, therefore, remains relatively stationary with respect to the eye opening. However, the action of gravity upon the weight member causes the eyeball member to swing about the "rolling axis" provided by the pin G and thus causes relative movement between the two members about this axis. As a result, the iris and pupil of the eyeball member move laterally or sidewardly in a direction opposite to the direction of tilting, but the eyelid member, with its lash, remains in its central open position with respect to the eye opening.

Free swinging or rolling of the eyeball member is assured by the arrangement of the motion limiting stops or ears 25 within their mating slots 27, for these elements fix the open position of the eye assembly by keeping the weight F from contacting the bottom wall of the housing (see Fig. 6) as the doll head is tilted. Also, to assure that the iris and pupil on the eyeball member do not appear to move to the corners of the eye openings an unduly great amount, the parts are proportioned so that the rear edge of the eyelid wall 20 engages a portion 44, or 44', of the weight member to limit the amount of relative movement, according to which side the doll's head is tilted. Thus in Fig. 12 the part 44 bears against the bottom corner of the eyelid A in the region near the righthand trunnion H. This preferably takes place just before the side edge of the weight hits the side of the housing (see Fig. 11), in order to avoid possibility of the weight element wedging against the inside of the housing.

Figure 13:
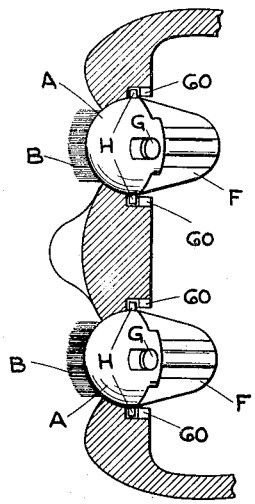
Fig. 13 is a horizontal cross-section through the front half of a doll's head formed of rigid material showing the manner in which eye assemblies of the present invention may be directly mounted in a head of this type without the use of intermediate members or housings.

While the preferred form of the eye assembly which has been described is particularly suitable for use in a flexible doll's head, it is within the scope of the invention to mount a pair of such assemblies directly within a doll's head formed of rigid material, and thereby eliminate the use of the housings L. This is shown in Fig. 13, wherein the horizontally arranged pivot means H are located in spaced open bearings 60 which are molded directly into the doll on each side of an eye opening. Any suitable means may be used to close off the open rear ends of the bearings in order to maintain the eye assemblies in position. The patents to Cohn et al., 2,601,741, granted July 1, 1952, and Kusold 2,601,742, granted July 1, 1952, illustrate examples of such means. In this way, a doll may be provided with eyes having lashes, and possessing both the sleeping and rolling movements, without necessitating the use of additional shells or covers which act to increase the depth that the eyes are set into the eye openings.

The particular form of eyelid member shown and described is made by injection molding the piece from flesh-colored plastic, so that it is unnecessary to apply a flesh color paint to the front or viewable eyelid surface 10. Also, known techniques of molding are used to form the apertures 30 and 32 in the molding operation itself, instead of by separate and additional drilling operations. This involves a suitable disposition of cores in the mold, and accounts for the core lines shown in Fig. 5 adjacent the apertures. Also, the outwardly extending trunnions 24, 24' are integrally molded with the eyelid member.

It will be apparent that the selection of flesh-colored plastic, the molding of apertures directly in the eyelid member, and the integral molding of the trunnions, all are intended to reduce the cost of manufacturing, and that it is within the scope of the invention to form the eyelid member from other materials, such as sheet metal, which is blanked, formed and perforated, and which is then painted or sprayed with the flesh coloring. If desired, a separate pin or shaft may be used to provide the trunnions, in which case the shaft may be bent at the center to clear the intersecting pin G. Also, the eyelid member may be formed with bearing apertures instead of trunnions, to mate with trunnions or a bent shaft supplied by the housing for the eye assembly, or by the doll itself when the head is rigid. The essential consideration is that means be provided for pivotally mounting the eyelid member for its sleeping movement about a horizontal axis.

The eyeball member specifically described is provided with an integrally formed weight. This form of the invention eliminates the weight arm and, of course, is highly suitable where there are limitations of space. It is within the scope of the broad aspects of the invention, however, to form the eyeball member of sheet metal with the iris and pupil lithographed thereon, or to form the eyeball member of plastic material with the iris and pupil portions as integral parts thereof, or in either case to use a separate lens for the iris and pupil portions, and in any event to provide the weight as a separate member secured to the eyeball member in any desired fashion, including even the use of a weight arm when there is no space limitation.

The rolling movement as well as the sleeping movement is smooth and dependable. It has already been pointed out that the mass and disposition of the weight causes a dependable sleeping movement. The rolling movement too is sensitive and incremental, and this, we believe, stems largely from the large rearward slope of the rolling axis or pin 46. A slight rearward slope sometimes has been used in rolling eyes, but the slope which we employ is so much greater that it is different in kind rather than degree. The slope is so great that the weight would be lifted if it were moved to one side or the other while holding the head still, and, conversely, therefore, the weight readily retains its lowermost gravitational position when the head is tilted to one side or the other. The response is a gradual and controlled response. The action is a floating action in which the eyes may move in small increments in response to a small tilting of the head, and is in contrast with an unstable eye action requiring a large tilt of the head, or resulting in an abrupt rolling movement all the way to an extreme end position, instead of a movement in controllable increments.

It is believed that the construction of the described eye assembly, and the components thereof, related one to another in the manner particularly described, as well as the advantages of the described assembly, will be apparent from the foregoing detailed description. It also will be apparent that while a preferred form of the invention has been shown and described, changes may be made in the structure disclosed, without departing from the spirit of the invention, as sought to be defined in the following claims.

We claim:

1. A doll's eye assembly of the sleeping-rolling type comprising an eyelid member and a separate eyeball member having an iris and pupil represented thereon, the front surfaces of the eyelid and eyeball members having substantially the same radius of curvature lying in a substantially continuous spherical surface broken by a split line where the two members abut each other, said eyelid member having horizontally arranged pivot means formed as a part of said eyelid member, and means pivotally connecting said eyelid and eyeball members to each other so that both members oscillate together about said horizontally disposed pivot means to supply the sleeping movement and the eyeball member may oscillate laterally with respect to the eyelid member for the rolling movement.

2. A doll's eye assembly of the sleeping-rolling type comprising an eyelid member, an eyelash secured thereto, and a separate eyeball member having an iris and pupil represented thereon, the front surfaces of the eyelid and eyeball members having substantially the same radius of curvature lying in a substantially continuous spherical surface broken by a split line where the two members about each other, said eyelid member having horizontally arranged pivot means formed as a part of said eyelid member, and means pivotally connecting said eyelid and eyeball members to each other so that both members oscillate together about said horizontally disposed pivot means to supply the sleeping movement and the eyeball member may oscillate laterally with respect to the eyelid member for the rolling movement, whereby when the eye assembly is mounted in a doll's head, the eyelash will remain centrally of the eye-opening during rolling movement of the eye.

3. A doll's eye assembly of the sleeping-rolling type comprising an eyelid member and a separate eyeball member having an iris and pupil represented thereon, the front surfaces of the eyelid and eyeball members having substantially the same radius of curvature lying in a substantially continuous spherical surface broken by a split line where the two members abut each other, said eyelid member having horizontally arranged pivot means formed as a part of said eyelid member, said eyeball member being provided with a weight, and means pivotally connecting said eyelid and eyeball members to each other so that the force of gravity upon said weight will cause both members to oscillate together about said horizontally arranged pivot means to supply the sleeping movement when the assembly is moved from an upright to a horizontal position and the same weight will cause the eyeball member to oscillate laterally with respect to the eyelid member for the rolling movement when the assembly is tilted sidewardly from an upright position.

4. A doll's eye assembly of the sleeping-rolling type comprising an eyelid member and a separate eyeball member having an iris and pupil represented thereon, the front surfaces of the eyelid and eyeball members having substantially the same radius of curvature lying in a substantially continuous spherical surface broken by a split line where the two members abut each other, said eyelid member being provided with horizontally arranged pivot means, said eyeball member being provided with a weight, and said eyelid and eyeball members being directly connected to each other by means providing a rearwardly inclined axis about which the eyeball member may oscillate laterally with respect to the eyelid member, the force of gravity upon said weight causing both members to oscillate together about said horizontally arranged pivot means to supply the sleeping movement when the assembly is moved from an upright to a horizontal position, and the same weight causing the eyeball member to oscillate laterally with respect to the eyelid member for the rolling movement when the assembly is tilted sidewardly from an upright position.

5. A doll's eye assembly of the sleeping-rolling type comprising an eyelid member, an eyelash secured thereto, and a separate eyeball member having an iris and pupil represented thereon, the front surfaces of the eyelid and eyeball members having substantially the same radius of curvature lying in a substantially continuous spherical surface broken by a split line where the two members abut each other, said eyelid member being provided with horizontally arranged pivot means, said eyeball member being provided with a weight, said eyelid and eyeball members being directly connected to each other by means providing a rearwardly inclined axis about which the eyeball member may oscillate laterally with respect to the eyelid member, the force of gravity upon said weight causing both members to oscillate together about said horizontally arranged pivot means to supply the sleeping movement when the assembly is moved from an upright to a horizontal position, and the same weight causing the eyeball member to oscillate laterally with respect to the eyelid member for the rolling movement when the assembly is tilted sidewardly from an upright position, whereby when the eye assembly is mounted in a doll's head, the eyelash will remain centrally of the eye-opening during rolling movement of the eye, and means provided by portions of said eyelid and eyeball members for limiting the amount the eyeball member may oscillate laterally with respect to the eyelid member.

6. A doll's eye assembly of the sleeping-rolling type comprising an eyelid member and a separate eyeball member having an iris and pupil represented thereon, the front surfaces of the eyelid and eyeball members having substantially the same radius of curvature lying in a substantially continuous spherical surface broken by a split line where the two members abut each other, said eyelid member having pivot means providing a horizontally arranged axis, said eyeball member being provided with a weight, and said eyelid and eyeball members being directly connected to each other by a pin intersecting said horizontally arranged axis to provide a rearwardly inclined axis about which the eyeball member may oscillate laterally with respect to the eyelid member, the force of gravity upon said weight causing both members to oscillate together about said horizontally arranged axis to supply the sleeping movement when the assembly is moved from an upright to a horizontal position, and the same weight causing the eyeball member to oscillate laterally with respect to the eyelid member for the rolling movement when the assembly is tilted sidewardly from an upright position.

7. A doll's eye assembly of the sleeping-rolling type comprising a molded eyelid member, and a separate diecast eyeball member having an iris and pupil represented thereon, the front surfaces of the eyelid and eyeball members having substantially the same radius of curvature lying in a substantially continuous spherical surface broken by a split line where the two members abut each other, said eyelid member being provided with integrally formed outwardly extending trunnions providing horizontally arranged pivot means, said eyeball member being provided with an integrally formed weight portion, said eyelid and eyeball members being directly connected to each other by means providing a rearwardly inclined axis about which the eyeball member may oscillate laterally with respect to the eyelid member, the force of gravity upon said weight portion causing both members to oscillate together about said horizontally arranged pivot means to supply the sleeping movement when the assembly is moved from an upright to a horizontal position, and the same weight portion causing the eyeball member to oscillate laterally with respect to the eyelid member for the rolling movement when the assembly is tilted sidewardly from an upright position.

8. A doll's eye assembly of the sleeping-rolling type comprising a molded eyelid member, an eyelash secured thereto, and a separate die-cast eyeball member having an iris and pupil represented thereon, the front surfaces of the eyelid and eyeball members having substantially the same radius of curvature lying in a substantially continuous spherical surface broken by a split line where the two members abut each other, said eyelid member being provided with integrally formed outwardly extending trunnions providing a horizontally arranged axis, said eyeball member being provided with an integrally formed weight portion, said eyelid and eyeball members being directly connected to each other by a pin intersecting said horizontally arranged axis to provide a rearwardly inclined axis about which the eyeball member may oscillate laterally with respect to the eyelid member, said eyelid and eyeball members being related to each other so that the pin is inclined at an angle of approximately 45° to the horizontal when the iris and pupil look directly forward in the open position of the eye, the force of gravity upon said weight portion causing both members to oscillate together about said horizontally arranged axis to supply the sleeping movement when the assembly is moved from an upright to a horizontal position, and the same weight portion causing the eyeball member to oscillate laterally with respect to the eyelid member for the rolling movement when the assembly is tilted sidewardly from an upright position, whereby when the eye assembly is mounted in a doll's head, the eyelash will remain centrally of the eye opening during rolling movement of the eye.

9. A doll's eye assembly of the sleeping rolling type comprising a housing having an eye opening and provided with bearings on diametrically opposite sides, an eyelid member, an eyelash secured thereto, and a separate eyeball member having an iris and pupil represented thereon, the front surfaces of the eyelid and eyeball members having substantially the same radius of curvature lying in a substantially continuous spherical surface broken by a split line where the two members abut each other, said eyelid member being provided with outwardly extending trunnions disposed in said bearings to provide horizontally arranged pivot means, said eyeball member being provided with a weight member, said eyelid and eyeball members being directly connected to each other by means providing a rearwardly inclined axis about which the eyeball member may oscillate laterally with respect to the eyelid member, the force of gravity upon said weight member causing both members to oscillate together about said horizontally arranged pivot means to supply the sleeping movement when the assembly is moved from an upright to a horizontal position, and the same weight member causing the eyeball member to oscillate laterally with respect to the eyelid member for the rolling movement when the assembly is tilted sidewardly from an upright position, whereby the eyelash will remain centrally of said eye opening during the rolling movement.

10. A doll's eye assembly of the sleeping-rolling type comprising a housing having an eye opening and provided with bearings on diametrically opposite sides, a molded eyelid member, an eyelash secured thereto, and a separate die-cast eyeball member having an iris and pupil represented thereon, the front surfaces of the eyelid and eyeball members having substantially the same radius of curvature lying in a substantially continuous spherical surface broken by a split line where the two members abut each other, said eyelid member being provided with integrally formed outwardly extending trunnions disposed in said bearings to provide horizontally arranged pivot means, said eyeball member being provided with an integrally formed weight portion, said eyelid and eyeball members being directly connected to each other by means providing a rearwardly inclined axis about which the eyeball member may oscillate laterally with respect to the eyelid member, the force of gravity upon said weight portion causing both members to oscillate together about said horizontally arranged pivot means to supply the sleeping movement when the assembly is moved from an upright to a horizontal position, and the same weight portion causing the eyeball member to oscillate laterally with respect to the eyelid member for the rolling movement when the assembly is tilted sidewardly from an upright position, whereby the eyelash will remain centrally of said eye opening during the rolling movement.

11. A doll's eye assembly of the sleeping-rolling type comprising an eyelid member, an immediately adjacent eyeball member, both having a substantially common spherical surface of substantially common radius and being divided from one another on an approximately diametric plane, said eyeball member being pivoted for rolling movement relative to the eyelid member by pivot means the axis of which is a diameter of said spherical surface disposed perpendicular to the aforesaid plane, said eyelid member being provided with a second pivot means for sleeping movement of the assembly, said second pivot means being located on a diameter of the spherical surface which lies approximately in the aforesaid plane and which is perpendicular to the rolling axis, an eyelash secured to and forming a part of the eyelid member substantially at the aforesaid plane of division, and a weight secured to the eyeball member.

12. A doll's eye assembly of the sleeping-rolling type comprising an eyelid member providing a spherical surface of about one-quarter of a sphere, a separate eyeball member constituting a spherical surface of about one-quarter of a sphere exposed beneath the eyelid member, said spherical surfaces having equal radii and a common center, means pivoting the eyelid member for sleeping movement of the assembly on an axis which is diametric of the sphere and approximately in the plane of the lower edge of the eyelid member, pivot means to afford rolling movement of the eyeball member relative to the eyelid member, said latter pivot means being secured to the eyelid member and serving to suspend and support the eyeball member from the eyelid member, said latter pivot means being disposed on an axis intersecting and perpendicular to the sleeping axis and approximately perpendicular to the aforesaid plane, and a weight secured to the eyeball member.

References Cited in the file of this patent

UNITED STATES PATENTS

| | | |
|---|---|---|
| 1,008,471 | Jacqueroid | Nov. 14, 1911 |
| 1,661,094 | Rommer | Feb. 28, 1928 |
| 1,958,861 | Popovich | May 15, 1934 |
| 2,039,928 | Popovich | May 5, 1936 |
| 2,663,972 | Lee | Dec. 29, 1953 |
| 2,696,064 | Wolfe et al. | Dec. 7, 1954 |

FOREIGN PATENTS

| | | |
|---|---|---|
| 634,266 | Great Britain | Mar. 15, 1950 |